Aug. 15, 1950    D. M. ANDRIST    2,518,590
BAITING MACHINE
Filed March 25, 1947    2 Sheets-Sheet 1
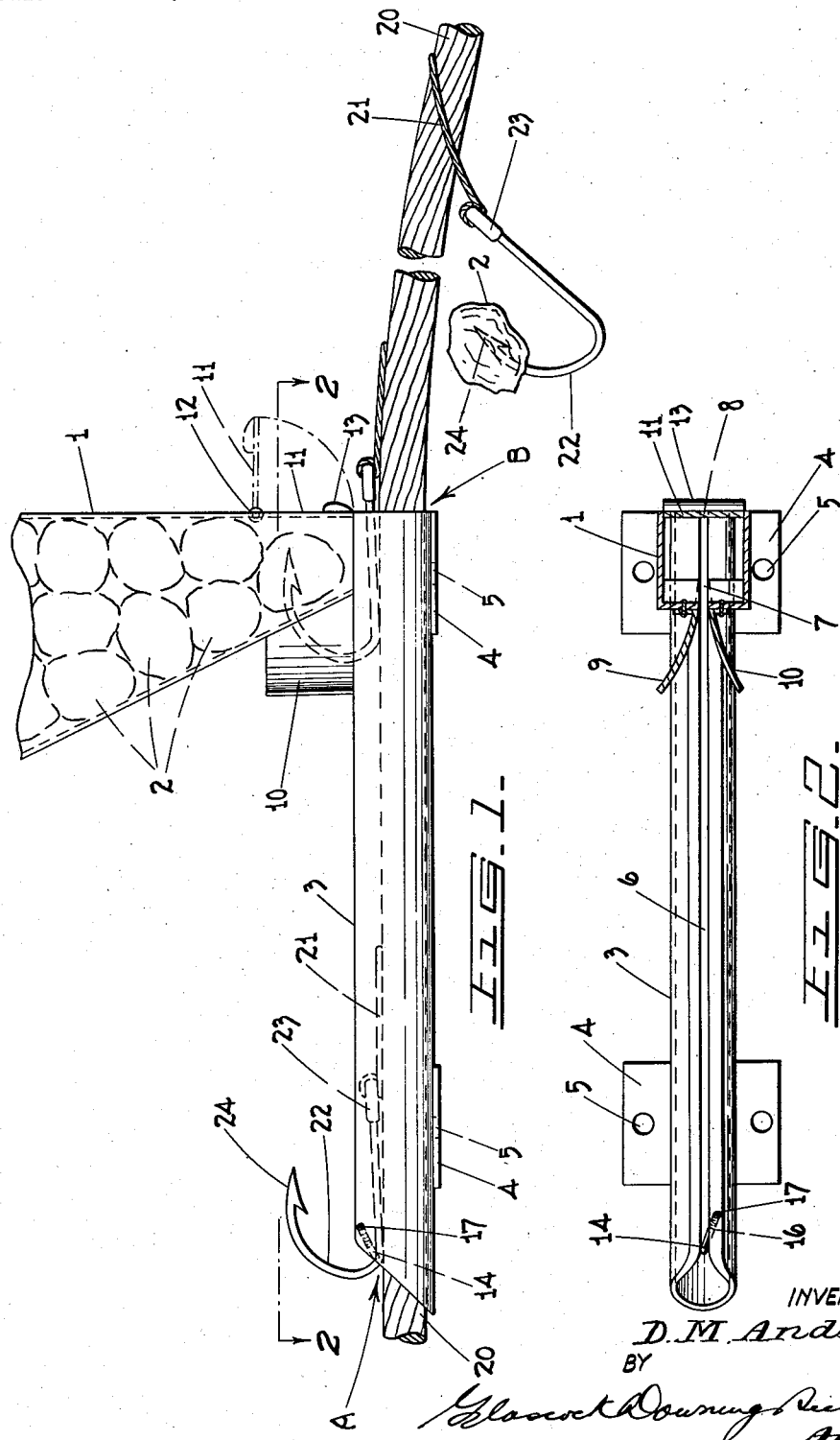
INVENTOR
D. M. Andrist
BY
Glascock Downing Diebold
Attys.

Aug. 15, 1950     D. M. ANDRIST     2,518,590
BAITING MACHINE

Filed March 25, 1947     2 Sheets-Sheet 2

INVENTOR
D. M. Andrist
BY
Glascock Downing & Seebold
Attys.

Patented Aug. 15, 1950

2,518,590

UNITED STATES PATENT OFFICE 2,518,590

BAITING MACHINE

David Minor Andrist, Victoria, British Columbia, Canada, assignor to Andhop Patents Limited, Victoria, British Columbia, Canada, a corporation of British Columbia Application March 25, 1947, Serial No. 737,175

12 Claims. (Cl. 43—4)

The present invention relates to baiting machines.

It is an object of the present invention to provide a baiting machine that may be used to bait a line of considerable length to which a large number of hooks are attached at spaced intervals.

Another object of the invention is the providing of a baiting machine that will automatically bait the hooks on a line as it is reeled out from a moving boat.

Additional objects and advantages of the invention will be set out below.

In the past, particularly in connection with deep-sea fishing, it has been customary to bait the line by hand. The line, with free hooks attached at intervals along its length, is unwound from a reel at one end of a boat; a section of bait is secured to each hook in turn and the baited line is let down into the water. This practice has on many occasions been proven to be a dangerous one and in addition it wastes a good deal of time. The use of the present invention will not only serve to obviate all hazards attendant on baiting by hand but in addition will result in the saving of much valuable time.

The invention consists in the construction, combination and arrangement of parts hereinafter described and more particularly pointed out in the appended claims.

One convenient embodiment of the invention will now be described by way of example with reference to the accompanying drawings in which:

Figure 1 is a side view of the baiting machine showing a section of the line with hooks attached, in the machine:

Figure 2 is a view along the line 2—2 in Figure 1 but without the section of line;

Figure 3:
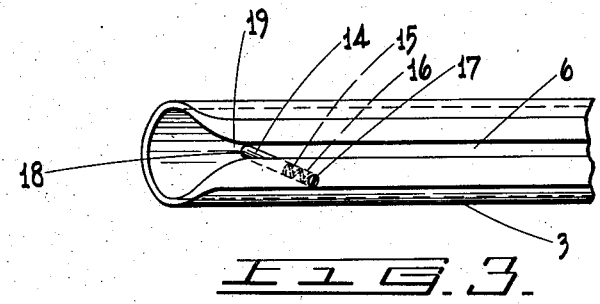
Figure 3 is a view, slightly enlarged, of one end of the machine as shown in Figure 2.

The baiting machine comprises a bait containing means on hopper 1 of conventional shape shown containing pieces of bait 2. The hopper is secured in upright position to one end B of a line-directing tube 3 which in turn may be secured to the boat by means of metal plates 4 and screws or bolts through holes 5. The end of the tube 3 opposite to that at which the hopper is attached, is bevelled at A to form a hook-positioning means. It is necessary to have the entrance to tube 3 and the hook-positioning means A more or less circular as shown. The remainder of the tube may be round, square or of any convenient or desired shape. The bevelled, circular construction of the hook-positioning means instantly forces the hooks with their barbs into upright position as soon as they come into contact with the tube-entrance.

A narrow aperture or hook-guiding means 6 extends from end to end of tube 3 in its upper surface. The aperture 6 coincides with a short, vertically-extending slot 7 situated at the bottom of the hopper 1. The exit end of the aperture 6 is indicated at 8. Secured to and abutting the lower end of the hopper at either side of the slot 7 are vanes or hook-aligning means 9 and 10 which in height are approximately equal to the length of the slot 7. These vanes extend divergently for a short distance along the tube 3 one on either side of the aperture 6. The vanes may be secured to the hopper by means of rivets or bolts or in any other suitable manner.

At the lower end of the hopper 1 in the wall opposite to the slot 7 is an opening covered by a small door or flap 11 suitably hinged at 12 and provided at its lower end with a weight 13. The door is intended to swing outwardly as shown in dotted lines in Figure 1 and is designed to exert pressure against the bait on the baited hook as it passes from the hopper, thus acting to secure the bait on the hook.

Figure 4:
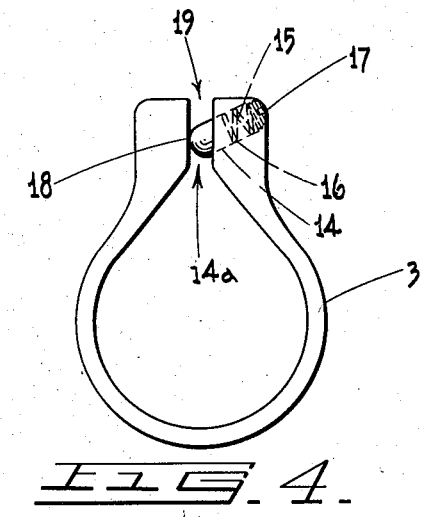
Figure 4 is an end view of the line-directing tube showing the hook-retaining means.

At a point close to the bevelled end of tube 3 and adjacent the aperture or hook-guiding means 6 there may be provided hook-retaining means housed within the wall of the tube 3 and comprising a plunger 14 held under compression by means of spring 15 contained in a short tube or housing 16, one end of which is closed by means of a screw 17 which may be removed whenever it is desired to insert a new spring. The free end 18 of the plunger 14 projects into and completely fills the entrance 19 of the aperture 6. This part of the machine is shown more clearly in Figure 3. The angle made by the plunger 14 with the wall of the line-directing tube at the entrance thereof must be somewhat less than a right angle and such that the hooks will not fail to depress the plunger. In addition the free end 18 of the plunger must be sufficiently well rounded that the hooks will not become wedged between the end of the plunger and the wall of the line directing means at the point 14a (Figure 4) and thereby fail to depress the plunger.

Shown in Figure 1 is a section of fishing-line 20 part of which is within the tube 3 and part of which extends beyond the tube. Short lines 21 are attached at intervals along line 20 and to each of these short lines a hook 22 is attached. Each hook has an eye 23 and a barb 24.

Figure 5:
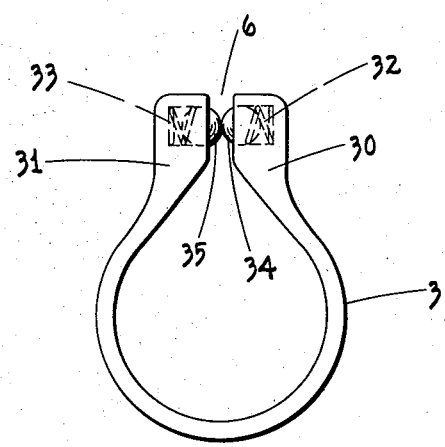
Figure 5 is a view of a modified hook-retaining means.

The modified hook-retaining means shown in Figure 5 may be located adjacent the bevelled end of the tube 3 and comprises paired housings 30 and 31 situated on either side of the aperture or hook-guiding means 6. The housings 30 and 31 contain springs 32 and 33 acting against ball-shaped plungers 34 and 35. The plungers come together mid-point of aperture 6 thus blocking or obstructing it.

In operation the fishing-line 20 which may be of any required weight is pulled from a reel and fed into the tube 3 at A and out of the tube at B. The free end of the line is then attached to a float and an anchor and dropped in the water. As the boat moves forward the line runs from the drum and each hook in turn is drawn through the baiting machine. As the hooks approach the machine they are hanging from the line 20 but are pulled into upright position by the bevelled end of the tube 3 by means of which the hooks are permitted to move forwardly and upwardly at the same time. The hook enters the aperture 6 at 19 and is in more or less upright position at this point. Any tendency on the part of the short lines 21 or the hooks themselves to ride out of the tube 3 through the aperture 6 is prevented by the end 18 of the plunger 14 comprising part of the hook-retaining means. However, when the hook reaches the point 19 it acts against the end 18 of the plunger 14 which is forced back against the spring 15 thus momentarily freeing the entrance 19 and permitting the hook to proceed with its barbed end 24 riding above the tube 3. Immediately the hook has passed through into the tube the spring 15 forces the plunger back into position where it remains until acted on by another hook.

The bevelled hook-positioning means shown at A in Figure 1 is an important feature of the present invention and without it it would be difficult if not impossible to direct the hooks into the hook-guiding slot 6. A line carrying one hundred or more hooks when once threaded through applicant's machine may be completely baited and neither the line nor the hooks need be touched by hand at any time during the baiting operation. It will be readily appreciated that the main line 20 as it is unreeled may be twisted slightly and in many cases the shorter lines 21 will be wound around line 20. Consequently it would be as impossible as it is unnecessary to have all hooks in the same relative position as one after another they approach the entrance to the tube 3. The hooks as they approach the machine are of course suspended at the ends of lines 21 and the barbs 24 may point forwardly, rearwardly or to either side, with respect to the machine. In fact, as it is drawn into the horizontal plane, after the short line 21 and the shank have been drawn into the machine and at the instant of its coming into contact with the hook-positioning means A, the barb of a particular hook might be in the downward position with the entire barb lying beneath the tube 3. However regardless of the position of the barb the hook-positioning means, due to its structure, forces the hook to swing either to right or left and into upright position. In every case, the hooks as they proceed into the entrance 19 do so with their barbs 24 uppermost since it would be impossible for them to do otherwise in view of the novel construction and functioning of the hook-positioning means A.

The modified hook-retaining means shown in Figure 5 operates as follows:

As the hook enters the aperture 6 it comes into contact with the plungers 34 and 35 and forces them to separate and move outwardly against the springs 32 and 33. When the hook has passed beyond the plungers 34 and 35 they are returned to position by the springs and so remain until forced apart by the next hook to move into position.

As the hook enters the hopper through the slot 7 it is held fully erect by the hook-guides 9 and 10 and in this position the hook inserts itself into a piece of the bait 2. The baited hook in moving forward displaces the door 11 which, because of the weight 13, offers sufficient resistance to the moving hook and bait to ensure that the barbed end of the hook is firmly secured within the section of bait. The baited hook leaves the tube 3 at B and is carried by the line 20 into the water.

It should be understood that applicant intends to manufacture baiting machines in more than one size in order to accommodate hooks of various sizes. However, with any one particular size of machine hooks of several sizes may be used but the diameter of line-directing tube 3 must not be larger than the greatest transverse dimension of the hooks and preferably is smaller. Where the diameter of the line-directing tube is greater than that of the hooks, the hooks may be drawn down into the line-directing tube in which case they will not come into contact with the bait in the hopper 1.

Furthermore, the width of the hook-guiding means 6 must never be greater and is preferably less than the outside diameter of the eye 23 on hook 24 otherwise the hook may on occasion pass up through the hook-guiding means 6 and come into contact with the hopper 1 thus hindering or preventing the passing of the line through the machine and probably resulting in damage to the machine.

It will be evident from the foregoing that applicant has made a useful invention. The baiting machine is of simple construction and efficient in operation and is a device that will be of great material advantage to fishermen, particularly those who use long lines set out with floats and anchors for fishing cod, halibut and dogfish.

It should be understood that the description presented above is intended to be of the nature of an example only. Modifications to any degree may be made within the scope of the appended claims.

What is claimed is:

1. A device for baiting fishing lines comprising a line-directing tube having hook-guiding means and hook-positioning means, in combination with means for guiding a supply of bait towards said hook-guiding means.

2. A baiting device for use in the baiting of fishing-lines having a plurality of hooks secured thereto at spaced intervals comprising a line-directing tube having hook-guiding means and hook-positioning means, in combination with, hook-retaining means, hook-aligning means and bait-containing means, said bait-containing means comprising in its lower portion oppositely-spaced inlet and outlet apertures communicating with said hook-guiding means, said apertures facilitating the passage into and from said bait-containing means of hooks traversing said hook-guiding means.

3. A baiting device for use in the baiting of fishing-lines having a plurality of hooks secured thereto at spaced intervals comprising a line-directing tube having hook-guiding means and hook-positioning means, in combination with hook-retaining means, hook-aligning means, bait-containing means comprising in its lower portion oppositely-spaced inlet and outlet apertures communicating with said hook-guiding means, said inlet aperture permitting the passage of unbaited hooks into said bait-containing means and into contact with the bait in said means, said outlet aperture permitting the passage from said bait-containing means of hooks having bait secured thereto; and bait-securing means designed to exert pressure against the bait on a baited hook during its exit from said bait-containing means.

4. The device according to claim 2, said line-directing tube being hollow, and one end of which is bevelled forming said hook-positioning means.

5. The device according to claim 2, the diameter of said line-directing tube being not greater than the greatest transverse dimension of any one of said plurality of hooks.

6. The device according to claim 1, said hook-guiding means comprising a long-narrow aperture extending from end to end of said line-directing tube.

7. The device according to claim 2 said hook-retaining means being housed within the wall of said line-directing tube.

8. The device according to claim 2, said hook retaining means comprising at least one spring-activated plunger situated adjacent one end of said line-directing tube and adjacent said hook-guiding means.

9. The device according to claim 2, said hook-retaining means comprising a plurality of spring-activated plungers situated adjacent one end of said line-directing tube and adjacent said hook-guiding means.

10. The device according to claim 2, said bait-containing means comprising a hopper secured in upright position at one end of said line-directing tube immediately above said hook-guiding means.

11. The device according to claim 2, said hook-aligning means comprising paired vanes secured in upright position to said line guiding means and abutting said bait-containing means one on either side of said inlet aperture, said vanes extending divergently for a short distance along said line-directing tube, one on either side of said hook-guiding means.

12. The device according to claim 3, said bait-securing means comprising a small weighted door hingedly secured to said bait-containing means and removably obstructing the said outlet aperture therein.

DAVID MINOR ANDRIST.

REFERENCES CITED

The following references are of record in the file of this patent:

UNITED STATES PATENTS

| Number | Name | Date |
| --- | --- | --- |
| 711,306 | Good | Oct. 14, 1902 |
| 718,067 | Adams | Jan. 13, 1903 |
| 1,632,414 | Nosan | June 14, 1927 |
| 1,996,681 | Marvol | Apr. 2, 1935 |